United States Patent Office 3,534,075
Patented Oct. 13, 1970

3,534,075
LIQUID HYDROCARBON COMPOSITIONS CONTAINING AMINE SALTS OF ETHYLENE DIAMINE TETRA ACETIC ACID AS ANTISTATIC AGENTS
Harry J. Andress, Jr., Pitman, N.J., assignor to Mobil Oil Corporation, a corporation of New York
No Drawing. Original application Mar. 5, 1968, Ser. No. 710,632, now Patent No. 3,449,097, dated June 10, 1969. Divided and this application Nov. 19, 1968, Ser. No. 794,820
Int. Cl. C07c 87/28, 101/26; C09f 7/00
U.S. Cl. 260—404.5
4 Claims

ABSTRACT OF THE DISCLOSURE

Liquid hydrocarbon compositions are provided containing, in an amount sufficient to impart antistatic properties, amine salts of ethylene diamine tetra acetic acid.

CROSS-REFERENCE TO RELATED APPLICATIONS

This application is a division of my copending application Ser. No. 710,632, filed Mar. 5, 1968, now U.S. Pat. No. 3,449,097.

BACKGROUND OF THE INVENTION

Field of the invention

This invention relates to organic liquids having desirable antistatic properties, and, in one of its aspects, relates more particularly to organic liquid compositions in the form of volatile organic liquids such as hydrocarbon fuels or solvents which possess low electrical conductivity which, when they accumulate electrostatic charges, may give rise to the hazards of ignition or explosion. Still more particularly in this aspect, the invention relates to the improvement of such organic liquids by incorporating therein, additives which are effective in increasing the electrical conductivity of such liquids to the extent that accumulation of electrostatic charges, with attendant danger of ignition or explosion, is significantly minimized, particularly in the handling, transportation or treatment of such liquids.

DESCRIPTION OF THE PRIOR ART

Prior to the present invention, the low electrical conductivity of many volatile organic liquid compositions has presented the problem of controlling static buildup, particularly during handling and transportation, for the purpose of insuring safe and effective distribution without the concomitant danger of ignition or explosion. For example, volatile organic liquids such as hydrocarbon fuel oils (e.g., gasoline, jet fuels, turbine fuels and the like), or light hydrocarbon oils employed for such purposes as solvents or cleaning fluids for textiles, possess a very low degree of electrical conductivity. In the use of such fluids, electrostatic charges, which may be generated by handling, operation or other means, tend to form on the surface, and may result in sparks, thus resulting in ignition or explosion. These hazards may be encountered merely in the handling or transportation of such organic liquids and even in operations, such as centrifuging, in which a solid is separated from a volatile liquid, during which electrostatic charges can accumulate.

Various materials have heretofore been proposed for incorporation into such organic liquid compositions for increasing their electrical conductivity and thus reduce the aforementioned dangers of ignition and explosion. Such materials, however, have not been proved to be sufficiently effective in increasing the desired electrical conductivity of these fluids and, in many instances, have been found to be too costly for the relatively small degree of increased protection which they are capable of providing.

SUMMARY OF THE INVENTION

In accordance with the present invention, improved liquid hydrocarbon compositions are provided containing, in an amount sufficient to impart antistatic properties, amine salts of ethylene diamine tetra acetic acid. The incorporation of these antistatic agents in the liquid composition, imparts increased electrical conductivity to an extent greater than that which has heretofore been realized with many other antistatic materials.

In general, the present invention, in its preferred applications, contemplates organic liquid compositions which normally are capable of accumulating a relatively large degree of electrostatic charge, resulting in the aforementioned hazards of ignition and explosion, having incorporated therein a small amount of the aforementioned amine salts, usually from about 1 to about 200, and preferably from about 5 to about 50 pounds per thousand barrels of the total of volume of the liquid composition.

A field of specific applicability of the present invention is in the improvement of organic liquid compositions in the form of petroleum distillate fuel oils having an initial boiling point from about 75° F. to about 135° F. and an end boiling point from about 250° F. to about 1000° F. It should be noted, in this respect, that the term "distillate fuel oils" is not intended to be restricted to straight-run distillate fractions. These distillate fuel oils can be straight-run distillate fuel oils, catalytically or thermally cracked (including hydrocracked) distillate fuel oils, or mixtures of straight-run distillate fuel oils, naphthas and the like, with cracked distillate stocks. Moreover, such fuel oils can be treated in accordance with well-known commercial methods, such as acid or caustic treatment, hydrogenation, solvent refining, clay treatment, and the like.

The distillate fuel oils are characterized by their relatively low viscosity, pour point and the like. The principal property which characterizes these contemplated hydrocarbons, however, is their distillation range. As hereinbefore indicated, this range will lie between about 75° F. and about 1000° F. Obviously, the distillation range of each individual fuel oil will cover a narrower boiling range, falling nevertheless, within the above-specified limits. Likewise, each fuel oil will boil substantially, continuously, throughout its distillation range.

Particularly contemplated among the fuel oils are Nos. 1, 2 and 3 fuel oils, used in heating and as diesel fuel oils, gasoline, turbine fuels and the jet combustion fuels, as previously indicated. The domestic fuel oils generally conform to the specifications set forth in ASTM Specification D396–48T. Specifications for diesel fuels for defined in ASTM Specification D975–48T. Typical jet fuels are defined in Military Specification MIL–F–56248.

The novel anti-static agents of the present invention may comprise any amine salt of ethylene diamine tetra acetic acid. Particularly preferred, and representative of such amine salts, are the tetra Primene 81R salt of ethylene diamine tetra acetic acid; the tetra Primene JMT salt of ethylene diamine tetra acetic acid; the tetra phenyl stearylamine salt of ethylene diamine tetra acetic acid; the tetra amine salt obtained by reacting 4 mols of the condensation product of 1 mol of oleyl diamine and 1 mol of oleic acid, with 1 mol of ethylene diamine tetra acetic acid; and the tetra amine salt obtained by reacting 4 mols of the condensation product of 1 mol of oleyl diamine and 1 mol of a tall oil fatty acid, with 1 mol of ethylene diamine tetra acetic acid. It will be understood, of course, that other amine salts of the aforementioned type may also be successfully incorporated into organic liquid compositions for their beneficial antistatic effect.

DESCRIPTION OF SPECIFIC EMBODIMENTS

The following examples will serve to illustrate the preparation of the novel antistatic agents of the present invention, and the affect thereof when these agents are present in organic liquid compositions for the purpose of effectively imparting antistatic properties thereto, and particularly with respect to liquid hydrocarbon fuels.

Example 1

200 grams (1 mol) of Primene 81R [1] was stirred with 73 grams (0.25 mol) of ethylene diamine tetra acetic acid for a period of about 3 to 4 hours at a temperature of from about 125°–130° C., to form the tetra Primene 81R salt of ethylene diamine tetra acetic acid.

Example 2

300 grams (1 mol) of Primene JMT[2] was stirred with 73 grams (0.25 mol) of ethylene diamine tetra acetic acid for a period of about 3 to 4 hours at a temperature from about 150°–160° C., to form the tetra Primene JMT salt of ethylene diamine tetra acetic acid.

Example 3

175 grams (0.5 mol) of phenyl stearylamine was stirred with 36.5 grams (0.125 mol) of ethylene diamine tetra acetic acid for a period of about 3 hours at a temperature of 125° C. to form the tetra phenyl stearylamine salt of ethylene diamine tetra acetic acid.

Example 4

420 grams (0.732 mol) of the condensation product of one mol of oleyl diamine and one mol of oleic acid at 300° C., and 50 grams (0.183 mol) of ethylene diamine tetra acetic acid were stirred at a temperature of 150° C. for a period of about 3 hours to form the corresponding tetra amine salt of the aforementioned condensation product and the ethylene diamine tetra acetic acid.

Example 5

320 grams (0.584 mol) of the condensation product of one mol of oleyl diamine and one mol of a mixture of tall oil fatty acids at 300° C. and 40 grams (0.146 mol) of ethylene diamine tetra acetic acid were stirred at a temperature of 150° C. for a period of about 2 hours to form the corresponding tetra amine salt of the aforementioned condensation product and the ethylene diamine tetra acetic acid.

In accordance with the data of the following table a series of comparative electrical conductivity tests were carried out for the purpose of determining the aforementioned properties of the compositions prepared in accordance with Examples 1 through 5 with respect to imparting antistatic properties to organic liquid compositions. The test employed for this purpose was electrical conductivity measured in picomhos (i.e., $10^{-12}$ mhos) per meter. In these tests the aforementioned anti-static agents were blended in a liquid hydrocarbon fuel composition comprising about 75% catalytically cracked component and about 25% straight-run component, boiling at a temperature from about 320°–720° F. The resulting fuel compositions were then evaluated for their degree of improvement in electrical conductivity, with the results shown in the table.

TABLE

| Composition | Anti-static agent | Concentration, lbs./1000 bbls. | Conductivity, picomhos/meter |
|---|---|---|---|
| Uninhibited fuel oil | | 0 | 7 |
| Do | +Example 1 | 10 | 211 |
| Do | +Example 2 | 10 | 308 |
| Do | +Example 3 | 10 | 442 |
| Do | +Example 4 | 10 | 380 |
| Do | +Example 5 | 10 | 392 |

As will be seen from the data of the examples of the foregoing table, a marked improvement in antistatic properties of organic liquid compositions is obtained through the use of the antistatic additives of the present invention. It will be understood, of course, that the improved organic liquid compositions of the present invention may, if so desired, contain various other additives or mixtures of such additional additives in order to further enhance their properties. Thus, the organic liquid compositions of the present invention may also contain such additives as antioxidants, detergents, dispersants, stability improvers and the like. It will also be understood that although the present invention has been described with preferred embodiments, various modifications and adaptations thereof may be resorted to without departing from the spirit and scope of the invention, as those skilled in the art will readily understand.

I claim:
1. An amine salt selected from the group consisting of:
   (a) the tetra phenyl stearylamine salt of ethylene diamine tetra acetic acid;
   (b) the tetra amine salt obtained by reacting 4 mols of the condensation product of 1 mol of oleyl diamine and 1 mol oleic acid with 1 mol of ethylene diamine tetra acetic acid; and
   (c) the tetra amine salt obtained by reacting 4 mols of the condensation product of 1 mol of oleyl diamine and 1 mol of a tall oil fatty acid with 1 mol of ethylene diamine tetra acetic acid.
2. The amine salt of claim 1 wherein said salt comprises the tetra phenyl stearylamine salt of ethylene diamine tetra acetic acid.
3. The amine salt of claim 1 wherein said salt comprises the tetra amine salt obtained by reacting 4 mols of the condensation product of 1 mol of oleyl diamine and 1 mol of oleic acid, with 1 mol of ethylene diamine tetra acetic acid.
4. The amine salt of claim 1 wherein said salt comprises the tetra amine salt obtained by reacting 4 mols of the condensation product of 1 mol of oleyl diamine and 1 mol of a tall oil fatty acid, with 1 mol of ethylene diamine tetra acetic acid.

References Cited

UNITED STATES PATENTS

| 2,805,203 | 9/1957 | Knapp et al. | 260—501.11 |
| 2,901,335 | 8/1959 | Fields et al. | 44—71 |
| 3,055,746 | 9/1962 | Eckert | 44—71 |
| 3,055,749 | 9/1962 | McDermott | 44—71 |
| 3,326,975 | 6/1967 | Lappin | 44—71 |
| 3,387,954 | 6/1968 | Capowski et al. | 44—71 |
| 3,397,152 | 8/1968 | Brown et al. | 260—570.8 |
| 3,407,051 | 10/1968 | Thompson et al. | 44—71 |
| 3,418,092 | 12/1968 | Andress et al. | 44—71 |
| 3,449,097 | 6/1969 | Andress | 44—71 |

(Other references on following page)

---

[1] A mixture of primary amines having a tertiary carbon atom attached to the amino (—NH₂) group, containing from about 12 to about 15 carbon atoms per amine molecule.
[2] A mixture of primary amines having a tertiary carbon atom attached to the amino (—NH₂) group containing from about 18 to about 24 carbon atoms per amine molecule.

OTHER REFERENCES

Rombusch et al.: "Antistatic Polyethylene Molding Compositions," 1967.

Rombusch et al.: "Antistatic Polyolefin Molded Articles," 1967.

LEWIS GOTTS, Primary Examiner

G. HOLLRAH, Assistant Examiner

U.S. Cl. X.R.

44—71; 260—501.11

UNITED STATES PATENT OFFICE
CERTIFICATE OF CORRECTION

Patent No. 3,534,075　　　　　　　　Dated October 13, 1970

Inventor(s) Harry J. Andress, Jr.

It is certified that error appears in the above-identified patent and that said Letters Patent are hereby corrected as shown below:

Column 2, line 61, "for", second occurrence, should read -- are --; line 63, "MIL-F-56248" should read -- MIL-F-5624B --.

Signed and sealed this 22nd day of December 1970.

(SEAL)
Attest:

EDWARD M. FLETCHER, JR.　　　　　　WILLIAM E. SCHUYLER, JR.
Attesting Officer　　　　　　　　　Commissioner of Patents